April 14, 1970 D. E. DOHLER ETAL 3,506,963

CHARACTER RECOGNITION SYSTEM

Filed Dec. 17, 1965 2 Sheets-Sheet 1

INVENTORS
DAVID E. DOHLER
WILLIAM W. HARDIN

BY Paul M. Brauner

AGENT

United States Patent Office 3,506,963
Patented Apr. 14, 1970

3,506,963

CHARACTER RECOGNITION SYSTEM

David E. Dohler, Endicott, N.Y., and William W. Hardin, Stewartville, Minn., assignors to International Business Machines Corporation, Armonk, N.Y., a corporation of New York Filed Dec. 17, 1965, Ser. No. 514,549
Int. Cl. G06k 7/015
U.S. Cl. 340—146.3 9 Claims

ABSTRACT OF THE DISCLOSURE

A flying spot scanner cooperates with suitable transport means for recurrently moving a portion of a document bearing characters to be read past the zone which is scanned by the flying spot scanner. Initially, the scanner scans a small area near that portion of the scanning zone where a line of characters first appears with the document in motion. When a line is detected, the scanning beam moves upward in small increments or steps each time it detects the upward moving line of characters. When the first line of characters is positioned at the top of the scanning zone, the transport means is stopped and the lines of characters are then scanned successively for recognition by a suitable character recognition system. When the scanning beam reaches the lowermost line, the transport driving means is again rendered operative to move the document again with the scanner beam following the line upward until the next line to be read is positioned at the top of the scanning zone. In the event of an unrecognizable character, the line in which the unrecognizable character occurs is moved to a position where a marking device marks the line bearing the defective character. Visual monitoring of the character scanning operations are also provided.

The present invention relates to character recognition systems, and particularly to an improved character recognition system of the type utilizing a flying spot scanner including a cathode ray tube or similar device for generating unique scanning patterns. More particularly, the present invention relates to a character recognition system of the type employing a cathode ray tube as a scanner, together with means for moving a document bearing information to be read under the control of the scanning means.

For optimum performance from a standpoint of maximum output, character readers of the type described require the ability to scan multiple lines of information successively from a document which is stationary. Once the number of lines which are visible within the scanning field have been read, it is necessary to reposition the document to provide a new group of lines to be scanned. Also, in the event that the scanner and the character recognition system associated therewith cannot properly identify a character and accordingly provide a reject signal, the scanner should be able to position the line containing the reject character at a position where the line can be marked by a suitable marking device for subsequent inspection by a human operator. Still a further provision which is desirable in machines of this type is a display device which will enable a human operator of the machine to visually inspect the information being scanned by the flying spot scanner.

Accordingly, it is a principal object of the present invention to provide an improved character recognition system of the type employing a cathode ray tube scanner which operates to control document positioning means in such manner that a document to be read is advanced from time to time in accordance with the amount of the characters read on the document by the scanner.

Still another object of the present invention is to provide a character recognition system employing a flying spot scanner in which the lack of recognition of a character by the system will cause the document to be positioned in such manner that a suitable mark may be made on the document to indicate the line containing the rejected character.

A further object of the invention is to provide an improved character recognition system employing a flying spot scanner in which the information being scanned by the scanner can be provided to a suitable display device for the use of a human operator of the system.

Still a further object of the invention is to provide an improved system of the type described in which where the document is one relatively long length as, for example, a roll of tape from a cash register or other transaction recorder, to provide means for recurrently moving the document by suitable amounts so that in effect the scanning opeation is relatively continuous for all of the information to be scanned from the document.

Briefly described, the present invention involves the provision of a flying spot scanner of conventional type with suitable horizontal and vertical deflection circuitry arranged to project a scanning beam onto the surface of a document to be read, within a suitably delineated scanning zone or area. Suitable transport means is provided for recurrently moving a portion of the document to be read past the scanning zone, and the transport driving means is controlled in conjunction with the operation of the cathode ray tube scanner. This circuit arrangement is such that the scanner will normally scan a small area near that portion of a scanning zone where a line of characters would first appear with the document in motion. When a line of characters is detected, the vertical deflection means is actuated to move the scanning beam upward in small increments or steps, the beam being advanced one increment or step each time that it detects the upwardly moving line of characters. This line riding operation is continued until the first line to be read is positioned near the top of the scanning zone, at which time the amount of deflection of the beam is indicative of the fact that the line has arrived at this point and the transport means is stopped. Thereafter, the search scan is turned off and a curve following scan or some other type of character analyzing scan is generated, so that the lines of characters of on the documents are scanned successively and the characters are recognized by means of some suitable character recognition system. As the scanning beam progresses downwardly through the scanning zone, it will eventually reach the lowermost line which it is able to scan in the scanning area. At this time the position of the scanning beam will be such that an indication is developed that it has reached the bottom of the scanning area whereupon the transport driving means is again rendered operative to move the document again with the scanner beam following the line upward until the next line to be read is now positioned at the top of the scanning zone. This operation continues until all of the information on the document has been scanned.

If, during the operation of the equipment, a reject operation occurs in which the character recognition equipment is unable to recognize a character, circuitry is provided which will, when rendered effective, energize the transport driving means so as to move the line on the document containing the unrecognizable character to a position where a line marking device can print or otherwise create a suitable mark on or in the document to designate the defective line. The apparatus may also be arranged so that the operator can visually monitor the operation of the equipment by utilizing a manual display control which will permit the examination of the operation of the system at various times, including the inspection of a rejected character so that, if desired, manual entry of the information may be employed if the operator can visually recognize the character which has been rejected by the character recognition system.

The foregoing and other objects, features and advantages of the invention will be apparent from the following more particular description of preferred embodiments of the invention, as illustrated in the accompanying drawings.

Figure 1:
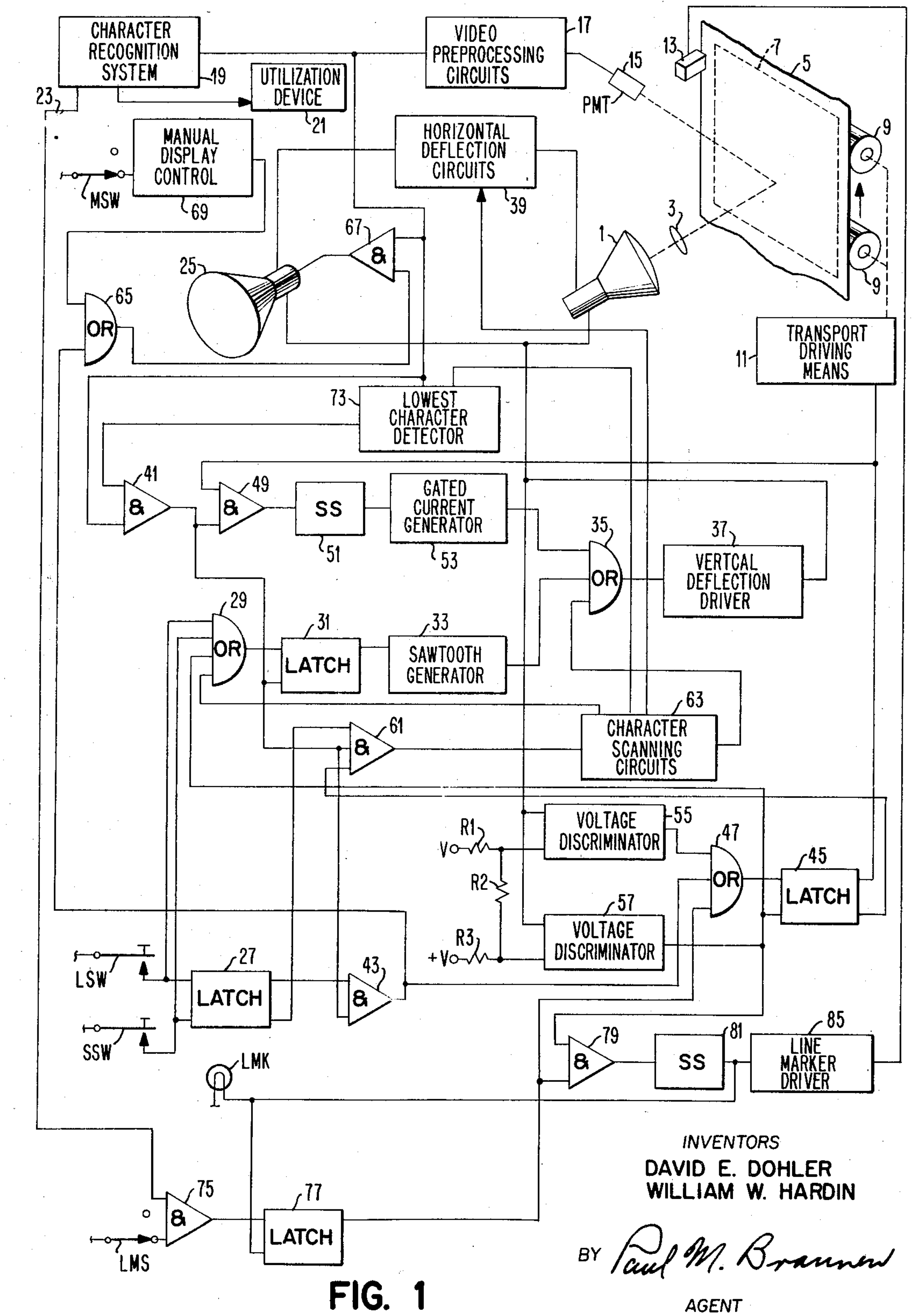
FIG. 1 is a schematic illustration of one form of character scanning and recognition system embodying a preferred embodiment of the present invention.

Referring to FIG. 1 of the drawings, there is shown a flying spot scanner comprising a cathode ray tube 1, a suitable optical system indicated diagrammatically by the lens 3, which cooperate to provide a suitable scanning beam which may, for example, be visible light rays which, by various controls to be subsequently described, may be positioned and moved at various points in an area on a document to be scanned. Such a document is shown at 5, arranged so that a circumscribed area or scanning zone indicated by the dashed line 7 can be encompassed by the scanning beam from the cathode ray tube scanner. The document can move in the direction indicated by the arrow, namely in an upward direction, as a result of the operation of the feed rolls 9 which are driven by means of a suitable transport driving means indicated generally by the rectangle 11. This transport driving means may be of any conventional nature, such as hydraulic or electrical motor means under the control of signals to be subsequently described which, when supplied, cause the document 5 to be moved in an upward direction at a predetermined speed and with predetermined acceleration and deceleration qualities. Located in proximity to the document 5 near the upper boundary of the scanning zone 7 is a line marking device 13, which is not shown in detail but which may comprise, for example, a solenoid operated print hammer arranged and adjusted so that when energized by suitable signals, it will cause a mark to be imprinted on the document to thereby indicate a line which is to be marked for a particular reason, for example, because of the presence of a character in the line which is unrecognizable by the character recognition circuitry associated with the system.

The variations in reflectivity caused as the flying spot scanner scans the document are detected by a suitable device such as a photomultiplier tube 15, which translates the variations in light intensity into electrical signals, usually designated as video signals, having a varying intensity in accordance with the variations in the reflection of the scanning energy. These signals are supplied from the photomultiplier tube 15 to video preprocessing circuit 17 of the type well known in the art, where the signals are amplified and suitably shaped for subsequent analysis. From the video preprocessing circuit 17, the video signals are supplied to a character recognition system, indicated generally by the rectangle 19, where the information is analyzed and decoded to provide output signals to a utilization device 21, indicative of the value of the character scanned. Since the exact form of the character recognition system utilized in the present invention is not pertinent, the details are not shown, as is the case with the number of other circuits shown in FIG. 1, since any one of a plurality of well known arrangements could be employed in the system. An output line 23 is provided from the character recognition system which will have a signal thereon any time that the character recognition system is unable to recognize a character and which signal will be utilized to govern a line display and line marking operation to be subsequently described.

The apparatus also includes a display tube 25 which is a cathode ray tube of ordinary variety connected and arranged so that, for example, the deflection voltages supplied thereto are the same as those supplied to the flying spot scanner tube 1, while the intensity control of the tube 25 is governed by the output of the video preprocessing circuit 17 via logic circuits to be subsequently described. It is possible through the use of a display tube 25 to display visually, under selected conditions, the information on the document 5 which is actually being scanned for the purpose of indicating to a human operator the scanned material as, for example, where a character in a line has been rejected, and visual inspection may make it possible for the operator to manually insert the information corresponding to the defective character in the utilization device 21.

For the most part, the remaining equipment is a combination of electronic circuits of various well known types, and rather than provide a detailed recitation or cataloguing of these parts, it is believed that the description of the invention will be enhanced by describing the operation of the equipment under various conditions where the various components of the system are called into play.

It will be assumed that the document 5 containing characters to be read therefrom has been fed into the transporting system in such manner that the beginning portion of the document is now occupying a position, such as that shown in the drawings, where the document is suitably engaged by the feed rolls 9 so that upon energization of transport driving means 11, the document will be moved upwardly.

With the document properly positioned for feeding, the operator depresses the control key LSW to carry out the loading operation of the system. This action causes a load latch 27 to be turned on and, via an OR circuit 29, to also cause a line search latch 31 to be turned on. With line search latch 31 turned on, a sawtooth generator 33 provides an output through an OR circuit 35 to a vertical deflection driver 37 which causes a rectilinear raster of small size to move from the top of the scanned zone or window 7 to the bottom thereof. During this time the horizontal deflection circuits 39 provide a very short horizontal sweep sufficient in length to insure that when the small raster encounters a character during its downward motion, the character will not be missed as would be the case if the downwardly travelling beam were not deflected horizontally by an amount sufficient to include any characters which may be encountered. The documents which are to be examined by the system are all arranged so that the lines of characters include at least one character in the zone which is examined by the searching raster. Thus, the searching raster will always encounter any lines of characters existing on the document. During the downward travel of the small search raster, if it encounters a character, the accompanying change in the signals from the photomultiplier tube 15 will be supplied via the circuit 17 and an AND circuit 41 to an input of latch 31 which turns this latch off. This signal is also supplied to one input of an AND circuit 43, a second input being the on output of the load latch 27. At this time, therefore, the AND circuit 43 will provide an output which is supplied via an OR circuit 47 to turn a transport control latch 45 to its on condition.

When the transport control latch 45 is turned on, the transport driving means 11 is accordingly energized and the drive rolls 9 will rotate to move the document 5 in an upward direction.

With the transport latch 45 on and video signals supplied as the result of the small line search raster intercepting characters at the lower portion of the scan zone 7, both inputs to an AND circuit 49 will be enabled, the output therefrom energizing a single shot 51 which supplies a signal to the gated current generator 53 to supply a signal therefrom through the OR circuit 35 to vertical deflection driver 37. The latch 31 having been previously turned off by the video line detection signal supplied from AND circuit 41, the sawtooth generator 33 will not be providing an output at this time. However, the gated current generator controlled by single shot 51 will now cause the vertical deflection driver 37 to supply energy to the cathode ray tube 1 which will cause the beam to take a short vertical upward jump. The horizontal deflection circuits 39 continue to be operative at this time so that, in effect, the small line searching raster is moved suddenly upward by a small increment of distance.

The paper will continue to move at this time and when the uppermost row of characters again is intercepted by the small line search raster, another line detect signal will be generated and passed by AND circuit 41 through AND circuit 49, single shot 51 and gated current generator 53 to cause still a further upward jump or increment of the scanning beam. As the paper continues to move upward, the topmost line of print will arrive at the new scan locations causing another line detect signal which then causes the scan raster to jump above the line by another short distance. In this fashion, the progression of the paper and the scan continue until the scan reaches a position near the top of the zone 7.

The vertical position of the small scanning raster is a function of the output of the vertical deflection driver 37. This voltage is continuously monitored by a set of voltage discriminators 55 and 57 which have supplied thereto positive and negative voltages via the network comprising resistors R1, R2 and R3 connected between the terminals designated as +V and −V. The negative voltage at the junction of resistors R1 and R2 is supplied to one input of voltage discriminator 55 and defines the lowermost position of the flying spot scanner beam, while the positive voltage at the junction of resistors R2 and R3 is supplied to one input of the voltage discriminator 57 and defines the uppermost limit of the scan zone for the flying spot scanner.

As the scan moves upward ahead of the upwardly travelling line of type, the output of vertical deflection driver 37 will be increasing in the positive direction, and when it equals or exceeds the reference voltage supplied to the other input of voltage discriminator 57, discriminator 57 will provide an output which is supplied to the latch 45 to turn the latch off. Accordingly, the transport driving means halts with the uppermost line of print in position at the top of the character scanning zone 7.

When latch 45 turns off, AND circuit 49 is disabled so that the single shot 51 and gated current generator 53 are no longer effective to cause upward vertical jumps of the small searching raster.

If the presence of a line had not been detected during the first line search operation, the line search latch 31 would have remained on and the scanning would have proceeded downwardly through the scanning zone 7 until the voltage discriminator 55 had detected that the bottom of the zone 7 had been reached by comparing the output signals from vertical deflection driver 37 with the fixed negative reference voltage. At this time a signal supplied through OR circuit 47 would turn the transport latch 45 on, thereby energizing the transport driving means to cause upward motion of the document while the scanning raster would continue to remain at the bottom of the zone searching for a line. When a line would be sensed on the upwardly moving paper, the line search latch 31 would be turned off as described previously and with the transport driving means energized, the line riding operation described above would proceed until the first line to be read had moved to the top of the scanning zone 7.

At this time, for the purposes of indicating the format of the first row of characters, for example, the information scanned by the cathode ray tube scanner will be displayed on the display cathode ray tube 25 as a result of the signal supplied from the output of AND circuit 43 which is fed through an OR circuit 65 and to an AND circuit 67 where it combines with the video signals from the video preprocessing circuits 17 to control the unblanking of the cathode ray tube 25. As previously pointed out, the deflection circuits for the cathode ray tube 25 are governed by the same circuitry that controls the deflection of the cathode ray tube scanner, and, accordingly, whatever material is scanned by the cathode ray tube scanner will be displayed by cathode ray tube 25 at this time.

It may also be noted at this point that it is possible to provide a manual display control which will at any time cause a projection of the scanning image on cathode ray tube 25 by closing of a manual display switch MSW which activates manual display control circuits 69.

When the operator is ready to start the machine actually reading the information from the document, he depresses the start switch SSW, which turns off the load latch 27 removing the display signal and turns on latch 31 via the OR circuit 29.

With line search latch 31 turned on, the sawtooth generator 33 is again activated. With a line of print already present at the scanning location, the line detect signal is supplied immediately from AND circuit 41 which shuts latch 31 off. With the transport latch 45 and the load latch 27 both in their off state, the line detect signal will complete the necessary inputs to AND circuit 61 which enables the character scanning circuit 63 to then commence scanning the line in whatever raster fashion is to be utilized for supplying appropriate scanning information to the character recognition system 19. The system therefore proceeds to scan the first line of information on the document at the top of the scan zone 7. Upon the completion of the scanning of the first line, the position of the scanning beam being taken into consideration, the circuit 63 will provide an output through OR circuit 29 to turn on the line search latch 31, whereupon the sawtooth generator 33 will cause the scan raster to start moving downward to detect the next line, whereupon the reading operation is resumed.

During the line reading operation the position of the lowest character in the line being read is detected and stored by suitable logic and analog storage circuits indicated generally by the rectangle 73, designated lowest character detector. At this time this detector will govern the AND gate 41 in such manner that line detect signals at the output of AND gate 41 wil not be provided until the search raster is below the level of the last line which has been read.

When the search raster arrives at the next lower line, the line detect signal turns off the line search latch and causes another reading operation via the AND circuit 61 as described above.

This sequence of operations is repeated until voltage discriminator 55 detects that the scan has reached the bottom of the scan zone 7. At that time an output is provided via OR circuit 47 to the transport latch 45, and transport driving means 11 is thereby energized to cause the document to move upward. The flying spot scanner again carries out the line riding operation previously described during the initial loading operation. When the next line to be read reaches the top of the scan zone, the transport driving means is stopped and the line reading operation is recommenced to read the next series of printed lines on the document as in the manner previously described.

The aforementioned sequence of operations would continue as described until all the lines on the document had been read. While there are no specific means shown in detail herein, it will be obvious to those skilled in the art that any suitable type of signalling device could be provided readily to indicate to the operator that the end of the document had been detected at the scanning zone 7, as for example by use of suitable micro switches or other devices for detecting the passage of the end of the document.

In some instances where the character recognition system is unable to distinctly recognize a character in a printed line, it is desirable to mark the line containing the character. In such a mode of operation, the operator will close the line mark switch LMS so that when a reject signal is present on line 23, the AND circuit 75 provides an output to turn on a line marking latch 77. When this latch is turned on, a signal is provided through OR circuit 47 to the transport latch 45 to turn on the transport latch and the scanning system will immediately go into the line riding mode as a result of the signal supplied via the AND circuit 49. When the line in question reaches the top of the scan zone 7 where the line marking device 13 is located, the output of voltage discriminator 57 supplies an input to an AND circuit 79, the other input of which is supplied from the on side of latch 77. The output of AND circuit 79 energizes a single shot 81 the output of which supplies a signal to an indicator such as the indication lamp LMK to provide a flash indicating the fact that a line mark action will take place, and also supplies a pulse to turn latch 77 off. Single shot 81 also provides the control signal to a line marker driver 85, which in turn energizes the line marking device 13 to thereby print or otherwise establish some sort of reference mark near or adjacent the line containing the defective character. With transport latch 45 turned off as a result of the output of voltage discriminator 57 which also caused the line marking operation, the line searching mode of the system will be resumed to thereby start the reading of the next line on the document.

Figure 2:
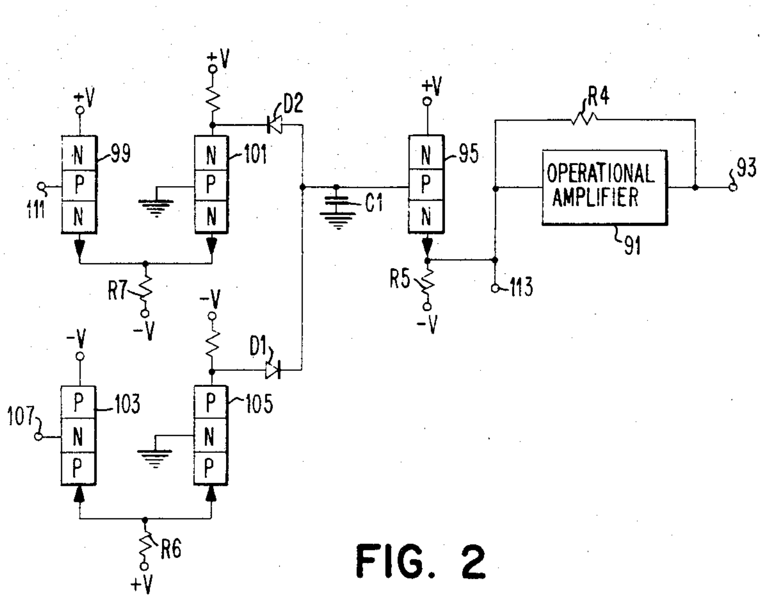
FIG. 2 is a schematic diagram of one portion of a vertical deflection circuit which may be utilized in the system shown in FIG. 1.

FIG. 2 of the drawing is a diagrammatic view of one circuit configuration showing how certain of the functions illustrated diagrammatically in FIG. 1 may be combined and implemented with transistor circuitry. Reference character 91 designates an operational amplifier of the conventional type with a feedback resistor R4, the output 93 of this amplifier being the vertical deflection voltage which is supplied to the vertical deflection driving circuits. This amplifier, in accordance with the usual design and construction of amplifiers of this type, will generate an output proportional to the input voltage which in turn is governed by the output of a transistor emitter follower including transistor 95 and a load resistor R5. The input to the base of transistor 95 comprises the voltage across a storage capacitor C1, so that as a result the vertical deflection amplifier 91 generates an output proportional to the voltage level on the capacitor C1.

The current for varying the charge on C1 comes from either of the two current sources including transistors 99 and 101 or transistors 103 and 105. The input 107 to the base of transistor 103 is the signal provided from the line search latch 31 when this latch is turned on. This signal at the base of transistor 103 will cause 103 to turn off and 105 to turn on thereby providing a positive current to flow to capacitor C1 via resistor R6, transistor 105, and diode D1. The rate of charge under these circumstances is determined principally by the value of resistor R6 and the capacity of the capacitor C1.

When line search latch 31 is turned off, transistor 103 conducts and 105 is cut off so that no additional charge current is available to the capacitor C1. By virtue of the isolation provided by the circuitry, the voltage at this time on capacitor C1 will remain substantially at the same value at least for the operating intervals involved in the system. The output from single shot 51 is supplied to terminal 111 of transistor 99 and turns this transistor off so that a certain amount of charge is removed from the capacitor C1 via the diode D2, transistor 101, and resistor R7. The amount of charge removed from capacitor C1 and hence the drop in voltage will be determined primarily by the value of the resistor R7 and the length of the pulse provided by the single shot 51.

Additional deflection signals, as from the character scanning circuits 63, can be supplied to the vertical deflection circuitry at terminal 113.

Figure 3:
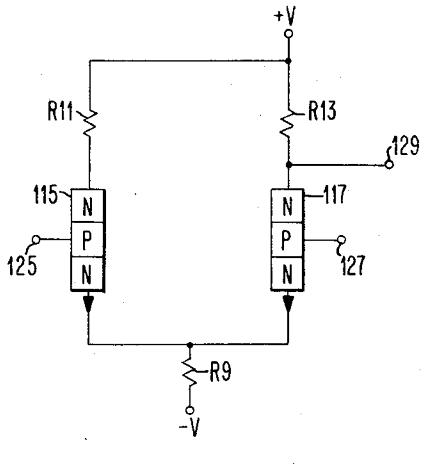
FIG. 3 illustrates one form of simple type of voltage discriminator which also may be used in the system shown in FIG. 1.

FIG. 3 shows a diagrammatic illustration of a simplified arrangement which may be used as a voltage discriminator for the discriminators 55 and 57 shown in FIG. 1. In the arrangement shown in FIG. 3 a pair of transistors 115 and 117 are connected with their emitters tied to a common emitter load resistor R9 so that the arrangement acts as a current switch which channels the current from resistor R9 through either resistor R11 or R13 depending upon which of the signals applied to the base of the transistors is most positive, these signals being applied at terminals 125 and 127. When terminal 127 is most positive, a voltage drop appears across resistor R13 and this drop provides a digital signal output at terminal 129 indicative of the relative levels of the input voltages at the terminals 125 and 127.

From the foregoing, it will be apparent that the present invention provides a character recognition system employing an improved type of arrangement wherein a flying spot scanner is connected with a document transport apparatus to facilitate the reading of documents containing many lines of printed matter, in such a manner that the output of the system is considerably improved in quantity. This desirable result is attained by arranging the flying spot scanner and the document transport controls in such an interacting fashion that the flying spot scanner performs preliminary searching operations to find a first line of type to be read and then the document transport causes this line to be moved to the upper limit of the scanning zone for the flying spot scanner whereupon scanning takes place until another line of print is required and the process is repeated. The location of the lines of characters is monitored by the scanning apparatus. The arrangement also provides for moving the document to an appropriate marking position in those instances where it is desired to mark a line for some reason, such as to designate a character which cannot be properly read by the character recognition system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A character recognition system comprising, in combination:

a flying spot scanner utilizing a scanning beam which is selectively deflected to all areas within a predetermined scanning zone, deflection control means for controlling the motion of said beam, and effective at times for generating a small searching raster which is deflected progressively through said scanning zone in a first direction, detection means responsive to the interception of characters to be read by said scanning beam, for producing video output signals, document transport means for progressively moving a document to be read through said predetermined scanning zone, and transport control means governed by said detection means and said deflection control means to move said document in a direction opposite to said first direction when said raster encounters a line of characters on said document.

2. A system as claimed in claim 1 further including initial limit detecting means for detecting the presence of said search raster at the boundary of said scanning zone at which the documents enter said scanning zone, and means connected to said initial limit detecting means and said detection means for governing said transport control means effective to advance the document to be read into said scanning zone.

3. A system as claimed in claim 2 further characterized by said deflection control means comprising incrementing means effective to cause said search raster to recurrently jump ahead of the first line of print on said document after the line has been located and the document is advancing, second limit detecting means for detecting the presence of said search raster at the boundary of said scanning zone opposite the boundary at which the documents entered said scanning zone, and said transport control means being governed by said deflection control means and said second limit detecting means.

4. A system as claimed in claim 3, further including character scanning circuit means for scanning characters for the purpose of analysis, said character scanning circuits being governed by said transport control means to be effective for scanning characters for analysis when and only when the document bearing said characters is stationary.

5. A system as claimed in claim 1, further including display means connected to said flying spot scanner and said detection means for displaying the information scanned by the flying spot scanner.

6. A system as claimed in claim 1, further including line marking means effective when energized for distinctively marking a line on said document, said line marking means being located adjacent the boundary of said scanning zone where the document exits from the scanning zone as it is moved through said scanning zone by said transport means, and line marker control means effective for energizing said line marker, said line marker control means being governed by said transport control means to be effective only when said document is stationary.

7. A character recognition system as claimed in claim 6, further comprising:

character recognition means for receiving scanning information from said detection means and providing outputs indicative of the characters scanned, said character recognition means further including means for supplying a reject signal when unable to provide a proper output, said line marking control means also being governed by said reject signal.

8. A character recognition system as claimed in claim 7, further including:

a manual control switch for selectively rendering said line marking means effective.

9. A character recognition system as claimed in claim 7, further including:

indicating means for indicating the operation of said line marking control means.

References Cited

UNITED STATES PATENTS

| | | | |
|---|---|---|---|
| 3,036,291 | 5/1962 | Whittle et al. | 340—146.3 |
| 3,206,725 | 9/1965 | Fitzmaurice | 340—146.3 |
| 2,877,846 | 3/1959 | Tobey | 250—219 |
| 2,894,058 | 7/1959 | Shapiro | 250—219 |
| 2,916,727 | 12/1959 | Jones | 178—6.6 |
| 3,138,669 | 6/1964 | Rabinow | 178—6.6 |
| 3,207,904 | 9/1965 | Heinz | 250—222 |
| 3,221,302 | 11/1965 | Silverberg | 250—219 |

T. A. ROBINSON, Primary Examiner

U.S. Cl. X.R.

178—6.8, 15